Figure 1:
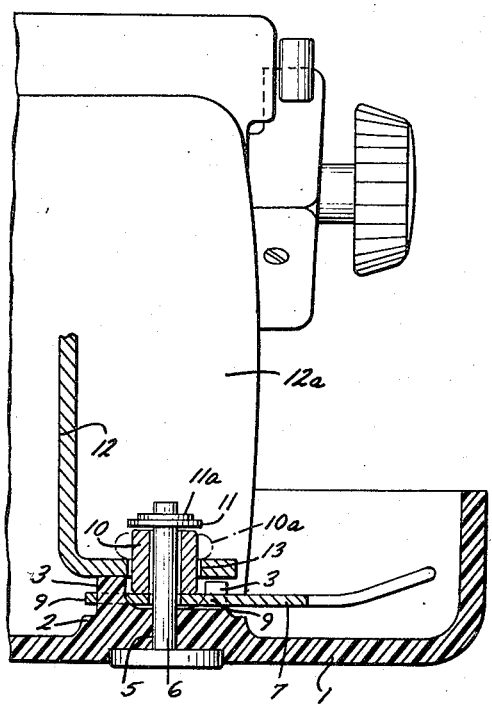

Sept. 15, 1959 O. KRAUSS ET AL 2,904,288
MECHANICAL CONNECTIONS
Filed Sept. 3, 1958

INVENTORS.
OTTO KRAUSS
HERMANN WALDENBURGER
BY
Michael S. Striker
ATTORNEY

2,904,288

MECHANICAL CONNECTIONS

Otto Krauss and Hermann Waldenburger, Nurnberg, Germany, assignors to Firma Triumph Werke Nuernberg A.G., Nurnberg, Germany Application September 3, 1958, Serial No. 758,847

Claims priority, application Germany March 5, 1958

15 Claims. (Cl. 248—25)

The present invention relates to mechanical connections in general, and more particularly to a mechanical connection of the type in which a resilient member is capable of connecting two structural elements when in deformed position while permitting disconnection or separation of the structural elements when it is allowed to reassume its normal unstressed shape. The improved assembly is particularly suitable for use in connection with certain office machines, for example, to releasably connect the base which forms the bottom element of the case for a portable typewriter with the typewriter proper.

It is already known to utilize a cylinder of resilient material in connecting devices between the base of a portable typewriter case and the typewriter frame. The cylinder is mounted on a pin which is rotatably received in the base and carries a cam plate causing compression of the cylinder when the pin is turned. The typewriter frame is formed with an opening which receives the cylinder before the latter is compressed. By rotating the pin in such manner as to cause compression of the cylinder, the latter is deformed and defines a bulge which bears against the typewriter frame and thus connects the typewriter with the base or bottom element of its case.

The disadvantage of such connecting devices is in that the pin requires an implement for rotating same or it must be formed with a slot to receive a screwdriver or another suitable turning tool. In addition, when such a device is used for connecting a portable typewriter with the bottom element of its case, the turning of pin necessarily must be effected at the underside of the bottom element. Thus, the machine must be inverted together with the bottom element which is rather inconvenient and tiresome. It is well known that the connections between a typewriter case and the portable typewriter should be operable from within the case for the express purpose that the lifting of typewriter and its case may be avoided.

Still further, the cam plate utilized in such known connecting devices must be so installed that it cannot rotate with respect to the resilient cylinder. Consequently, the cylinder must be held under constant tension and is at least slightly deformed even when in idle or non-retaining position. This brings about certain complications in the assembling of components parts in such connecting devices.

An important object of the present invention is to provide a mechanical connection which overcomes the drawbacks of just described prior assemblies in that it is operable from that side of one structural element which is turned toward the other structural element to be connected thereto.

Another object of the invention is to provide a mechanical connection of the type utilizing a resilient connecting member which requires no separate tools for its actuation but may be operated by an element forming a component part of the mechanical connection.

An additional object of the instant invention is to provide a mechanical connection of the type above set forth which is so constructed that the resilient connecting member is unstressed when in idle or non-retaining position.

A further object of the invention is to provide a mechanical connection which is particularly suitable for releasably connecting a typewriter or another office machine with a desk or with the bottom element of a portable case, at least one component part of which may be formed as an integral element of the desk or the bottom element.

A still further object of the invention is to provide a mechanical connection which is very simple, easy to operate, easy to install, reliable in use, which requires little space, and which is capable of diversified uses whenever a connection between two or more structural elements must be established.

The above and certain other objects of the invention are attained by the provision of a cam assembly which is preferably integral with one of the to-be-connected structural elements, of a supporting member or bolt for a resilient retaining member of cylindrical shape, of means for retaining the resilient member on the bolt, and of an actuating device mounted on the bolt in such manner as to compress the resilient member in one position and to permit return of resilient member into original unstressed state in another position. The actuating device, when moved with respect to the bolt, is guided between and into its two positions by the aforementioned cam assembly and may perform either radial or angular movements with respect to the bolt, depending upon the configuration of the cam assembly. The bolt and the resilient member, the latter in unstressed condition, are insertable into an aperture in the second structural element and the resilient member, either by mere friction or by deformation, retains the second structural element in such position when the actuating device is moved in a direction to deform or at least to subject the resilient member to considerable stresses sufficient to prevent removal of said resilient member from the aperture in the second structural element. The bolt need not be turned when the improved mechanical connection is actuated either to connect or to disconnect two structural elements and the actuating device being fixed to the bolt at that side of one structural element which faces the other structural element, the connection may be operated from inside and requires no turning of structural elements.

When not in retaining position, the resilient member is freely slidable along the supporting bolt and thus need not be subjected to any stresses; this is of advantage when the improved mechanical connection is assembled. As before stated, the cam assembly, preferably comprising a pair of stops and suitable sloping or curved cam surfaces, may be integral with one structural element, e.g. with the bottom element or base of a portable typewriter case, and the actuating device or lever is then formed with a follower portion which cooperates with the inclined cam surfaces to travel in directions toward and away from the adjacent end face of the resilient member and to thereby either compress and eventually deform the latter, or to permit return of the resilient member back into normal releasing or unstressed shape. By forming the cam assembly as an integral part of one structural element, e.g. of the bottom element in the case for a portable typewriter, the cam assembly may be manufactured by injection molding or by another suitable process together with the bottom element. Thus, the costs for manufacture, finishing and installation of separate cam assemblies are dispensed with.

Figure 2:
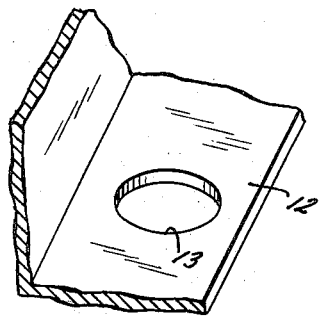
Figure 2:
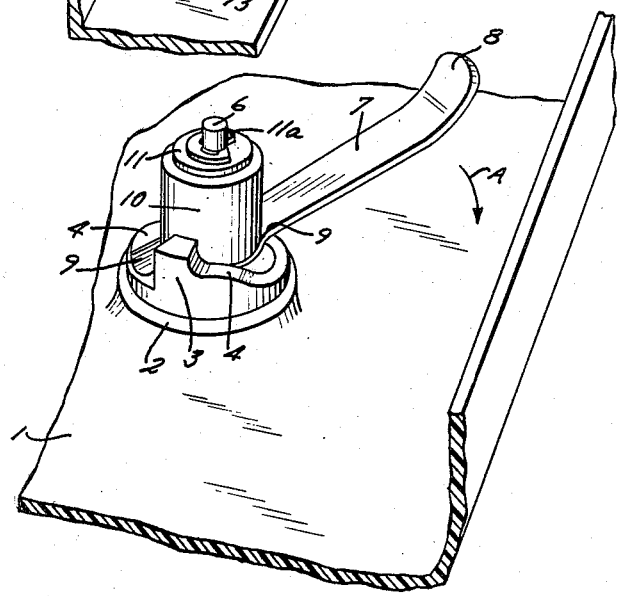

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing, in which:

Fig. 1 is sectional view of the mechanical connection applied to the base forming the bottom element of a portable typewriter case, and of a structural element forming part of the typewriter and placed into position for locking to the base; and Fig. 2 is perspective view of the assembly shown in Fig. 1, with the structural element lifted above the connection.

Referring now in greater detail to the drawing, the base plate or bottom element 1 of a typewriter case (cover not shown) is integrally formed with a preferably circular projection or protuberance 2 which latter, in turn, is integral with a pair of annularly arranged cams each comprising an undulated substantially semicircular cam surface 4 sloping with respect to base plate 1, and a stop or abutment 3. Abutments 3 are diametrically opposed to each other, i.e. their angular distance is about 180 degrees. The base 1 and the protuberance 2 define a bore 5 for reception of supporting member or bolt 6 which may, but need not, be fixed to the base. The bolt swingably supports an actuating device or lever 7 whose one end 8 constitutes the handgrip or actuating portion and whose other end 9 constitutes a follower pivotally mounted on bolt 6 and adjacent to the sloping cam surfaces 4. A cylindrical sleeve 10 of resilient material is loosely placed onto that portion of bolt 6 which extends beyond the follower 9 of lever 7 and is held in such position with slight freedom of axial movement by a retaining member or washer 11 which is maintained at the free end of bolt 6 by a slotted disk 11a radially slidable into a suitable reduced neck zone of the bolt (not shown). Sleeve 10 is axially slidable on member 6 and, being of elastic nature in that it is made of rubber or a like substance, may be deformed by the follower 9 of lever 7 when the latter is turned about the bolt 6 and travels toward the raised portions of cam surfaces 4. It will be noted that the cam surfaces 4 and stops 3 are disposed adjacent to the periphery or mantle of resilient member 10 and that the lower end face of said member rests upon the follower 3.

When the releasable mechanical connection is in open or non-retaining position, all parts are in the position shown in full lines in Figs. 1 and 2. The typewriter 12a, shown only in Fig. 1, is then placed onto the structural element or base 1 in such manner that a portion of its frame 12, which is provided with a bore or aperture 13, surrounds a portion of the peripheral zone or mantle of resilient member 10 and rests upon the stops or abutments 3 of protuberance 2. By turning lever 7 in the direction of arrow A, follower 9 slides along the cam surfaces 4 in upward direction away from the base or structural element 1 and causes movement of resilient sleeve 10 in the axial direction of bolt 6 upwardly toward the disk or washer 11. Upon further angular movement of lever 7 in the same direction, its follower 9 abuts against the adjacent end and causes compression of sleeve 10 in the axial direction of bolt 6 whereby the sleeve defines an annular bead or bulge 10a which is shown in phantom lines in Fig. 1. When the follower 9 is turned through about 180 degrees, a portion of sleeve or cylinder 10 extending beyond that surface of frame 12 which is turned away from base plate 1 is compressed to such an extent that the bulge or bead 10a positively prevents removal of frame 12 over the free end of bolt 6.

The removal of portable machine 12a with its frame or structural element 12 is carried out by reversing the above-described sequence of steps. Thus, level 7 is turned in a direction opposed to that indicated by arrow A whereby the follower 9 descends by sliding along sloping cam surfaces 4 in downward direction toward base 1 to permit expansion of cylinder or sleeve 10 back into its full-line position. The bulge 10a disappears as the upper end of sleeve 10 moves away from washer 11 and the frame 12 may be removed over the free end of bolt 6.

It will be understood that the compression of cylinder or sleeve 10 need not be such as to cause the formation of a bulge or bead 10a thereon, it being often sufficient that the cylinder 10 and frame 12 engage merely by friction to an extent satisfactory to provide a connection of reasonable strength between structural elements 1 and 12.

It will further be understood that, when the improved releasable connection is utilized with a portable typewriter, at least two but preferably more such assemblies are installed on, or formed integrally with, the base 1, each assembly being operable by its own lever or actuating device 7. As before stated, the connection has been shown as applied to the base of a typewriter case only by way of example since its field of application is practically unlimited, the improved system being capable of use whenever a releasable connection between two structural elements is required.

In addition, the compression of sleeve or cylinder 10 may be brought about by a modified lever 7 and by a modified cam assembly 3, 4. For example, the lever need not be swingable about bolt 6 but may be provided with an elongated slot and so installed as to be slidable in a direction which is radial with respect to the axis of member 6. The cam assembly 3, 4 then requires some modification insofar as it should cause the actuating device to descend in a direction toward the structural element to which the lower end of the bolt is fixed for release of the connection, and should bring about compression of the resilient member by the actuating device when the latter is in another radial position farther away from said structural element. In other words, the novel mechanical connection for releasably joining a stationary structural element with a removable structural element may be actuated by any device having a first position in which the resilient retaining member or sleeve is compressed to retain, either frictionally or by the formation of a bulge, the removable structural element, and a second position in which the resilient member is free to assume its normal unstressed shape to permit disconnection of the removable structural element.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

We claim:

1. A mechanical connection for releasably joining a pair of structural elements one of which has an aperture, said connection comprising, in combination: a supporting member having an axis, a first end connected with the other of said structural elements, and a free end; a cam assembly defining at least one cam surface and connected with said other structural element; a retaining member connected with the free end of said supporting member; a resilient member receiving said supporting member and disposed between said retaining member and said cam assembly; and an actuating device mounted on said supporting member intermediate said resilient member and said cam assembly for movement along the cam surface relative to said supporting member between a first position in which said resilient member is in unstressed condition and a second position in which said resilient member is compressed between said actuating device and said retaining member and subjected to deformation, said connection operating in such manner that, when said resilient member is inserted in unstressed condition into the aperture in said one structural element and said actuating device is moved into said second position, the resilient member engages with said one structural element and connects same with said other structural element and, when said actuating device is returned into said first position the resilient member returns into unstressed condition and may be withdrawn from the aperture in said one structural element.

2. A mechanical connection comprising, in combination: a structural element; a cam assembly connected with said structural element and having a pair of cam surfaces sloping with respect to said structural element; a supporting member connected with and extending from said structural element intermediate said cam surfaces, and having a free end; a retaining member at the free end of said supporting member; a resilient sleeve on said supporting member, said sleeve having a first end adjacent to said retaining member and a second end adjacent to said cam surfaces; and an actuating device comprising a follower mounted on said supporting member intermediate the second end of said sleeve and said cam surfaces in such manner as to have freedom of movement with respect to said supporting member along said cam surfaces between a first position in which it compresses and deforms said sleeve by moving the latter against said retaining member and a second position in which said sleeve is in unstressed condition.

3. A mechanical connection comprising, in combination: a structural element; a cam assembly connected with said structural element and having a pair of cam surfaces sloping with respect to said structural element; a supporting member having an axis, connected with and extending from said structural element intermediate said cam surfaces, and having a free end; a retaining member at the free end of said supporting member; a resilient sleeve axially slidably mounted on said supporting member, said sleeve having a first end adjacent to said retaining member and a second end adjacent to said cam surfaces; and an actuating device comprising a follower mounted on said supporting member intermediate the seecond end of said sleeve and said cam surfaces in such manner as to have freedom of movement with respect to said supporting member along said cam surfaces between a first position in which it compresses and deforms said sleeve by moving the latter against said retaining member and a second position in which said sleeve is in unstressed condition.

4. A mechanical connection comprising, in combination: a structural element; a substantially annular cam assembly connected with said structural element and having a pair of substantially semicircular cam surfaces sloping with respect to said structural element; a supporting member connected with and extending from said structural element intermediate said cam surfaces, and having a free end; a retaining member at the free end of said supporting member; a resilient sleeve on said supporting member, said sleeve having a first end adjacent to said retaining member and a second end adjacent to said cam surfaces; and an actuating device comprising a follower rotatably mounted on said supporting member intermediate the second end of said sleeve and said cam surfaces in such manner as to have freedom of angular movement with respect to said supporting member along said cam surfaces between a first position in which it compresses and deforms said sleeve by moving the latter against said retaining member and a second position in which said sleeve is in unstressed condition.

5. A mechanical connection comprising, in combination: a structural element; a cam assembly connected with said structural element and having a pair of spaced cam surfaces sloping with respect to said structural element; a supporting member having an axis, connected with and extending from said structural element intermediate said cam surfaces, and having a free end; a retaining member at the free end of said supporting member; a resilient sleeve on said supporting member, said sleeve having a first end adjacent to said retaining member and a second end adjacent to said cam surfaces; and an actuating device comprising a follower mounted for radial movements with respect to the axis of said supporting member intermediate the second end of said sleeve and said cam surfaces along said cam surfaces between a first radial position in which it compresses and deforms said sleeve by moving the latter against said retaining member and a second radial position in which said sleeve is in unstressed condition.

6. A mechanical connection comprising, in combination: a structural element; a cam assembly integral with said structural element and having a pair of cam surfaces sloping with respect to said structural element; a supporting member connected with and extending from said structural element intermediate said cam surfaces, and having a free end; a retaining member at the free end of said supporting member; a resilient sleeve on said supporting member, said sleeve having a first end adjacent to said retaining member and a second end adjacent to said cam surfaces; and an actuating device comprising a follower mounted on said supporting member intermediate the second end of said sleeve and said cam surfaces in such manner as to have freedom of movement with respect to said supporting member along said cam surfaces between a first position in which it compresses and deforms said sleeve by moving the latter against said retaining member and a second position in which said sleeve is in unstressed condition.

7. A mechanical connection comprising, in combination: a plate; a cam assembly integral with said plate and having a pair of cam surfaces sloping with respect to the plane of said plate; a bolt connected with and extending from said plate intermediate said cam surfaces, and having a free end distant from said plate; a retaining washer at the free end of said bolt; a resilient cylinder on said bolt having a first end adjacent to said washer and a second end adjacent to said cam surfaces; and an actuating lever comprising a handgrip portion distant from said bolt and a follower portion mounted on said bolt intermediate the second end of said cylinder and said cam surfaces in such manner as to have freedom of movement with respect to said bolt along said cam surfaces between a first position in which it compresses and at least slightly deforms said cylinder by moving the latter against said washer and a second position in which said cylinder is in unstressed condition.

8. A mechanical connection comprising, in combination: a plate; a substantially annular cam assembly integral with said plate and having a pair of substantially semicircular cam surfaces sloping with respect to the plane of said plate and a pair of diametrically opposed stop members; a bolt connected with and extending from said plate intermediate said cam surfaces, and having a free end distant from said plate; a retaining washer at the free end of said bolt; a resilient cylinder on said bolt having a first end adjacent to said washer and a second end adjacent to said cam surfaces; and an actuating lever comprising handgrip portion distant from said bolt and a follower portion rotatably mounted on said bolt intermediate the second end of said cylinder and said cam surfaces in such manner as to have freedom of angular movement with respect to said bolt along said cam surfaces and intermediate said stop members between a first angular position in which it compresses and at least slightly deforms said cylinder by moving the latter against said washer and a second angular position in which said cylinder is in unstressed condition.

9. In combination: a base plate having an upper side; a projection integral with said base plate and extending above said upper side, said projection defining a pair of spaced cam surfaces inclined with respect to said upper side; a bolt connected with said base plate, extending upwardly between said cam surfaces and having a free end spaced from said upper side; a retaining member fixed to the free end of said bolt; a resilient cylinder loosely received on said bolt intermediate said cam surfaces and said retaining member, said cylinder having an upper end, a lower end and a peripheral zone; an actuating lever having a follower portion mounted on said bolt intermediate the lower end of said cylinder and said cam surfaces in such manner as to have freedom of movement with respect to said bolt and along said cam surfaces between a first position in which it compresses and deforms said cylinder by moving the latter in upward direction whereby the upper end of said cylinder abuts against said retaining member, and a second position in which said cylinder is in unstressed condition; and a typewriter having a frame defining an aperture of a diameter slightly exceeding the diameter of said cylinder when the latter is in unstressed condition whereby, when said frame is placed onto said base in such manner that the peripheral zone of said cylinder extends into and through said aperture and said follower portion is moved into said first position, the cylinder is deformed and engages said frame to connect the typewriter with said base plate.

10. In combination: a base plate having an upper side; a projection rigidly connected with said base plate and extending above said upper side, said projection defining a pair of spaced cam surfaces inclined with respect to said upper side; a bolt connected with said base plate, extending upwardly between said cam surfaces and having a free end spaced from said upper side; a retaining member fixed to the free end of said bolt; a resilient cylinder loosely received on said bolt intermediate said cam surfaces and said retaining member, said cylinder having an upper end, a lower end and a peripheral zone; an actuating lever having a follower portion mounted on said bolt intermediate the lower end of said cylinder and said cam surfaces in such manner as to have freedom of movement with respect to said bolt and along said cam surfaces between a first position in which it compresses and deforms said cylinder by moving the latter in upward direction whereby the upper end of said cylinder abuts against said retaining member, and a second position in which said cylinder is in unstressed condition; and a typewriter having a frame defining an aperture of a diameter slightly exceeding the diameter of said cylinder when the latter is in unstressed condition whereby, when said frame is placed onto said base in such manner that the peripheral zone of said cylinder extends into and through said aperture and said follower portion is moved into said first position, the cylinder is deformed and engages said frame to connect the typewriter with said base plate.

11. In combination: a base plate having an upper side; a projection integral with said base plate and extending above said upper side, said projection defining a cam assembly consisting of a pair of substantially semicircular cam surfaces inclined with respect to said upper side and a pair of diametrically opposed stop members intermediate said cam surfaces; a bolt connected with said base plate, extending centrally upwardly between said cam surfaces and having a free end spaced from said upper side; a retaining member fixed to the free end of said bolt; a resilient cylinder loosely received on said bolt intermediate said projection and said retaining member, said cylinder having an upper end, a lower end and a peripheral zone; an actuating lever having a follower portion rotatably mounted on said bolt intermediate the lower end of said cylinder and said projection in such manner as to have freedom of angular movement with respect to said bolt intermediate said stop members and along said cam surfaces between a first position in which it compresses and deforms said cylinder by moving the latter in upward direction whereby the upper end of said cylinder abuts against said retaining member, and a second position in which said cylinder is in unstressed condition; and a typewriter having a frame defining an aperture of a diameter slightly exceeding the diameter of said cylinder when the latter is in unstressed condition whereby, when said frame is placed onto said base in such manner that the peripheral zone of said cylinder extends into and through said aperture and said follower portion is rotated into said first position, the cylinder is deformed and engages said frame to connect the typewriter with said base plate.

12. In combination: a base plate having an upper side; a projection integral with said base plate and extending above said upper side, said projection defining a pair of spaced cam surfaces inclined with respect to said upper side; a bolt connected with said base plate, extending upwardly between said cam surfaces and having a free end spaced from said upper side; a retaining member fixed to the free end of said bolt; a resilient cylinder loosely received on said bolt intermediate said cam surfaces and said retaining member, said cylinder having an upper end, a lower end and a peripheral zone; an actuating lever having a handgrip portion distant from said bolt and a follower portion mounted on said bolt intermediate the lower end of said cylinder and said cam surfaces in such manner as to have freedom of movement with respect to said bolt and along said cam surfaces between a first position in which it compresses and deforms said cylinder by moving the latter in upward direction whereby the upper end of said cylinder abuts against said retaining member, and a second position in which said cylinder is in unstressed condition; and a typewriter having a frame defining an aperture of a diameter slightly exceeding the diameter of said cylinder when the latter is in unstressed condition whereby, when said frame is placed onto said base in such manner that the peripheral zone of said cylinder extends into and through said aperture and said follower portion is moved into said first position, the cylinder is deformed and engages said frame to connect the typewriter with said base plate.

13. In combination: a base plate having an upper side; a projection integral with said base plate and extending above said upper side, said projection defining a pair of spaced cam surfaces inclined with respect to said upper side; a bolt connected with said base plate, extending upwardly between said cam surfaces and having an axis and a free end spaced from said upper side; a retaining member fixed to the free end of said bolt; a resilient cylinder axially slidably received on said bolt intermediate said cam surfaces and said retaining member, said cylinder having an upper end, a lower end and a peripheral zone; an actuating lever having a follower portion mounted on said bolt intermediate the lower end of said cylinder and said cam surfaces in such manner as to have freedom of movement with respect to said bolt and along said cam surfaces between a first position in which it compresses and deforms said cylinder by moving the latter in upward direction whereby the upper end of said cylinder abuts against said retaining member, and a second position in which said cylinder is in unstressed condition; and a typewriter having a frame defining an aperture of a diameter slightly exceeding the diameter of said cylinder when the latter is in unstressed condition whereby, when said frame is placed onto said base in such manner that the peripheral zone of said cylinder extends into and through said aperture and said follower portion is moved into said first position, the cylinder is deformed and engages said frame to connect the typewriter with said base plate.

14. A mechanical connection for releasably joining a pair of structural elements one of which has an aperture, said connection comprising, in combination: a supporting member having an axis, a first end connected with the other of said structural elements, and a free end; a cam assembly defining a pair of spaced cam surfaces sloping with respect to and integral with said other structural element, said cam surfaces being disposed in such manner that said supporting member extends therebetween; a retaining member connected with the free end of said supporting member; a resilient member receiving said supporting member and disposed between said retaining member and said cam assembly; and an actuating device mounted on said supporting member intermediate said resilient member and said cam assembly for movement along said cam surfaces relative to said supporting member between a first position in which said resilient member is in unstressed condition and a second position in which said resilent member is compressed between said actuating device and said retaining member and subjected to deformation, said connection operating in such manner that, when said resilient member is inserted in unstressed condition into the aperture in said one structural element and said actuating device is moved into said second position, the resilient member engages with said one structural element and connects same with said other structural element and, when said actuating device is returned into said first position the resilient member returns into unstressed condition and may be withdrawn from the aperture in said one structural element.

15. A mechanical connection for releasably joining a pair of structural elements one of which has an aperture, said connection comprising, in combination: a cam assembly integral with the other of said structural elements and defining a pair of substantially semicircular cam surfaces sloping with respect to said other structural element; a supporting member having an axis, a first end connected with said other structural element, extending from said other structural element substantially centrally between said cam surfaces, and having a free end distant from said other structural element; a retaining member at the free end of said supporting member; a resilient cylinder receiving said supporting member and disposed between said retaining member and said other structural element; and an actuating device rotatably mounted on said supporting member intermediate said cylinder and said cam assembly for angular movements along said cam surfaces and about said supporting member between a first position in which said cylinder is in unstressed condition and a second position in which said cylinder is compressed between said actuating device and said retaining member and subjected to deformation, said connection operating in such manner that, when said cylinder is in unstressed condition and is inserted into said aperture and said actuating device is rotated into said second position, the cylinder engages with said one structural element and connects same with said other structural element whereas, when said actuating device is rotated back into said first position the cylinder returns into unstressed condition and may be withdrawn from said aperture.

No references cited.